United States Patent
Fukuda et al.

(10) Patent No.: US 9,640,197 B1
(45) Date of Patent: May 2, 2017

(54) EXTRACTION OF TARGET SPEECHES

(71) Applicant: INTERNATIONAL BUSINESS MACHINES CORPORATION, Armonk, NY (US)

(72) Inventors: Takashi Fukuda, Kanagawa-ken (JP); Osamu Ichikawa, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/077,523

(22) Filed: Mar. 22, 2016

(51) Int. Cl.
*G10L 21/00* (2013.01)
*G10L 21/028* (2013.01)
*G10L 21/0264* (2013.01)
*G10L 25/21* (2013.01)
*G10L 21/0216* (2013.01)

(52) U.S. Cl.
CPC ........ *G10L 21/028* (2013.01); *G10L 21/0264* (2013.01); *G10L 25/21* (2013.01); *G10L 2021/02166* (2013.01)

(58) Field of Classification Search
CPC ...... G10L 2021/02166; G10L 21/0272; H04R 25/552; H03H 2021/0034; H03H 21/0012
USPC ................................................ 704/500, 226
See application file for complete search history.

(56) References Cited

U.S. PATENT DOCUMENTS

| | | | |
|---|---|---|---|
| 6,339,758 B1 * | 1/2002 | Kanazawa | G10L 21/02 381/94.3 |
| 8,503,697 B2 | 8/2013 | Amada | |
| 8,712,770 B2 | 4/2014 | Fukuda et al. | |
| 8,762,137 B2 | 6/2014 | Fukuda et al. | |
| 2012/0140948 A1 | 6/2012 | Terada et al. | |

OTHER PUBLICATIONS

Delikaris-Manias, S. et al., "Cross Pattern Coherence Algorithm for Spatial Filtering Applications Utilizing Microphone Arrays" IEEE Transactions on Audio, Speech, and Language Processing vol. 21, No. 11, Nov. 2013. (pp. 2356-2367).

Dmour, M.A., "Mixture of Beamformers for Speech Separation and Extraction" Engineering thesis and dissertation collection, Oct. 2010. (pp. 1-211).

(Continued)

*Primary Examiner* — Charlotte M Baker
(74) *Attorney, Agent, or Firm* — Tutunjian & Bitetto, P.C.; Vazken Alexanian

(57) ABSTRACT

Methods and systems are provided for separating a target speech from a plurality of other speeches having different directions of arrival. One of the methods includes obtaining speech signals from speech input devices disposed apart in predetermined distances from one another, calculating a direction of arrival of target speeches and directions of arrival of other speeches other than the target speeches for each of at least one pair of speech input devices, calculating an aliasing metric, wherein the aliasing metric indicates which frequency band of speeches is susceptible to spatial aliasing, enhancing speech signals arrived from the direction of arrival of the target speech signals, based on the speech signals and the direction of arrival of the target speeches, to generate the enhanced speech signals, reading a probability model, and inputting the enhanced speech signals and the aliasing metric to the probability model to output target speeches.

20 Claims, 10 Drawing Sheets

(56) References Cited

OTHER PUBLICATIONS

Himawan, I. et al., "Microphone Array Beamforming Approach to Blind Speech Separation" Machine Learning for Multimodal Interaction, vol. 4892, Jun. 2007. (pp. 295-305).
Maganti, H.K. et al., "Speech Enhancement and Recognition in Meetings With an Audio-Visual Sensor Array" IEEE Transactions on Audio, Speech, and Language Processing, vol. 15, No. 8, Nov. 2007. (pp. 2257-2269).

\* cited by examiner

|  | System | CER (%) |
|---|---|---|
| Baseline | Case 1) | 62.1 |
| Comparative examples | Case 2) MVBF | 39.7 |
| | Case 3) MVBF + Zelinski Post-filter | 20.8 |
| | Case 4) Case 3 + Model compensation | 14.8 |
| Example | Case 5) Case 3 + Factorial modeling, $v$ and $e$ | 11.4 |

EXTRACTION OF TARGET SPEECHES

BACKGROUND

Technical Field

This invention relates generally to an extraction of target speeches and, more particularly, to an extraction of target speeches from a plurality of speeches coming from different directions of arrival.

Description of the Related Art

Automatic speech recognition (ASR) is now being widely used in many business solutions. Call-center monitoring is a good example. The agent's speech and the customer's speech on the telephone line are recorded separately by a logger and also transcribed separately. The agent's speech is usually used for checking the agent's performance, while the customer's speech is mainly used to detect unhappy customers who should be brought to a supervisor's attention. The customer's speech may also be further analyzed for the customer's potential needs.

Face-to-face conversations are often observed in situations of sales or automobiles. In the sales, conversations are made between an agent or a customer over a desk or a counter. In the automobiles, conversations are made between a driver and a passenger during the driving.

There is a significant need to monitor the Face-to-face conversations, for example, in the financial industry, as similar with a call-center monitoring. Accordingly, the transcription of such conversations is usually made in these days.

SUMMARY

According to one aspect of the present invention, an embodiment of the present invention provides a computer-implemented method for extracting target speeches from a plurality of speeches coming from different directions of arrival. The method comprises obtaining speech signals from each of speech input devices disposed apart in predetermined distances from one another; for each pair of the speech input devices, calculating, based on the speech signals, a direction of arrival of target speeches and directions of arrival of other speeches other than the target speeches; for each pair of the speech input devices, calculating an aliasing metric, based on the direction of arrival of the target speeches and the directions of arrival of the other speeches, where the aliasing metric indicates which frequency band of speeches is susceptible to spatial aliasing; using an adaptive beamformer, enhancing the speech signals arrived from the direction of arrival of the target speech signals, based on the speech signals and the direction of arrival of the target speeches, to generate the enhanced speech signals; reading a probability model which is the product of a first normal distribution and a second normal distribution, where the first normal distribution is a model which has learned features of clean speeches and the second normal distribution is a model which has a mean in the probability distribution of the enhanced speech signals and is made so as to have a variance smaller than that of the first normal distribution in a case where the aliasing metric is close to zero, and inputting the enhanced speech signals and the aliasing metric to the probability model to output target speeches.

According to another aspect of the present invention, a system such as a computer system comprising a computer readable storage medium storing a program of instructions executable by the system to perform one or more methods described herein may be provided.

According to another aspect of the present invention, a computer program product comprising a computer readable storage medium storing a program of instructions executable by the system to perform one or more methods described herein also may be provided.

BRIEF DESCRIPTION OF THE DRAWINGS

The disclosure will provide details in the following description of preferred embodiments with reference to the following figures.

FIG. 6 illustrates experimental results according to one embodiment of the present invention.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
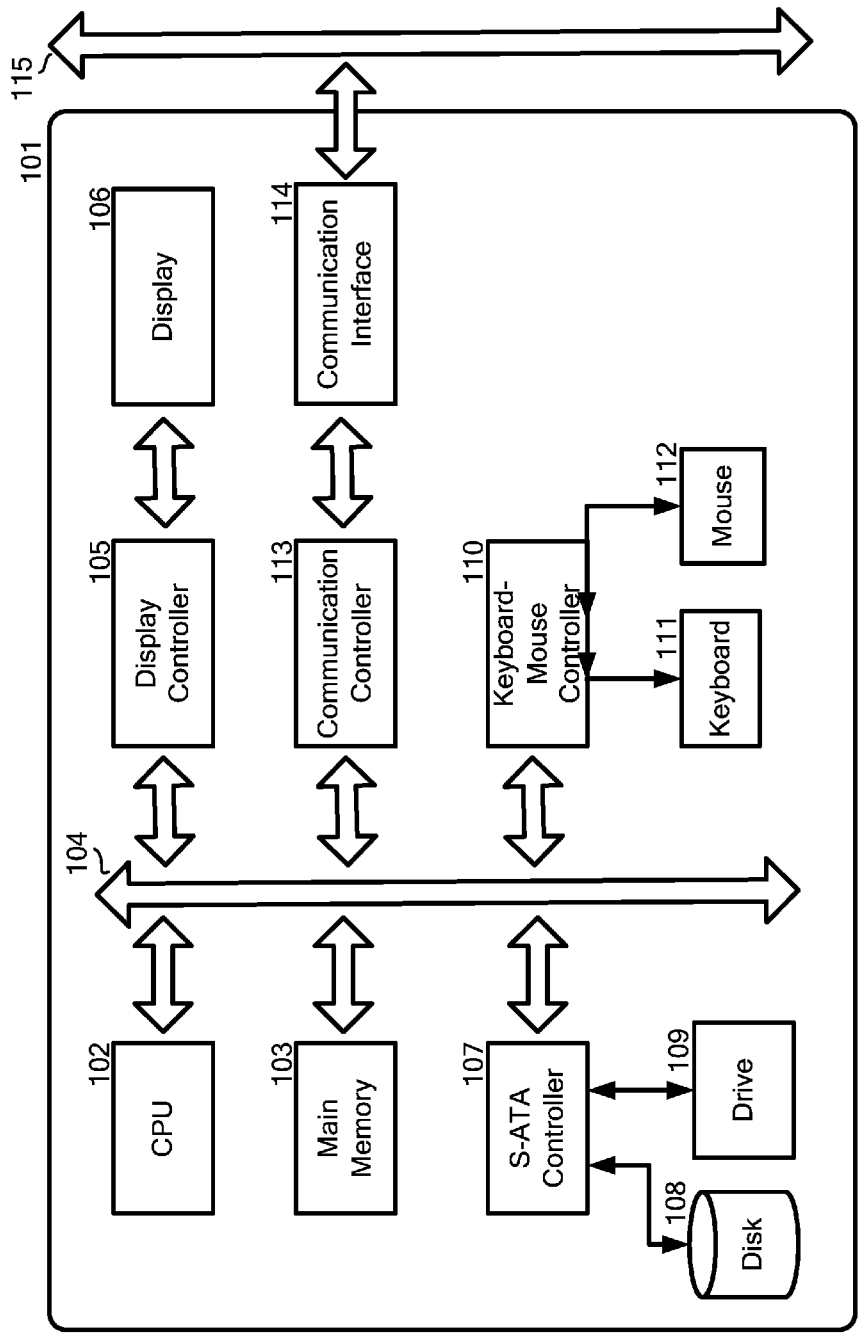
FIG. 1 illustrates an exemplified basic block diagram of a computer hardware used in an embodiment of the present invention.

With reference now to FIG. 1, FIG. 1 illustrates an exemplified basic block diagram of a computer hardware used in an embodiment of the present invention.

A computer (101) may be, for example, but is not limited to, a desktop, a laptop, a notebook, a tablet or a server computer. The server computer may be, for example, but is not limited to, a workstation, a rack-mount type server, a blade type server, or a mainframe server and may run, for example, a hypervisor for creating and running one or more virtual machines. The computer (101) may comprise one or more CPUs (102) and a main memory (103) connected to a bus (104). The CPU (102) may be preferably based on a 32-bit or 64-bit architecture. The CPU (102) may be, for example, but is not limited to, the Power® series of International Business Machines Corporation; the Core I™ series, the Core 2™ series, the Atom™ series, the Xeon™ series, the Pentium® series, or the Celeron® series of Intel Corporation; or the Phenom™ series, the Athlon™ series, the Turion™ series, or Sempron™ of Advanced Micro Devices, Inc. ("Power" is registered trademark of International Business Machines Corporation in the United States, other countries, or both; "Core i", "Core 2", "Atom", and "Xeon" are trademarks, and "Pentium" and "Celeron" are registered trademarks of Intel Corporation in the United States, other countries, or both; "Phenom", "Athlon", "Turion", and "Sempron" are trademarks of Advanced Micro Devices, Inc. in the United States, other countries, or both).

A display (106) such as a liquid crystal display (LCD) may be connected to the bus (104) via a display controller (105). The display (106) may be used to display, for management of the computer(s), information on a computer connected to a network via a communication line and information on software running on the computer using an appropriate graphics interface. A disk (108) such as a hard disk or a solid state drive, SSD, and a drive (109) such as a CD, a DVD, or a BD (Blu-ray disk) drive may be connected to the bus (104) via an SATA or IDE controller (107). Moreover, a keyboard (111) and a mouse (112) may be connected to the bus (104) via a keyboard-mouse controller (110) or USB bus (not shown).

An operating system, programs providing Windows®, UNIX® Mac OS®, Linux®, or a Java® processing environment, Java® applications, a Java® virtual machine (VM), and a Java® just-in-time (JIT) compiler, such as J2EE®, other programs, and any data may be stored in the disk (108) to be loadable to the main memory. ("Windows" is a registered trademark of Microsoft corporation in the United States, other countries, or both; "UNIX" is a registered trademark of the Open Group in the United States, other countries, or both; "Mac OS" is a registered trademark of Apple Inc. in the United States, other countries, or both; "Linux" is a registered trademark of Linus Torvalds in the United States, other countries, or both; and "Java" and "J2EE" are registered trademarks of Oracle America, Inc. in the United States, other countries, or both).

The drive (109) may be used to install a program, such as the computer program of an embodiment of the present invention, readable from a CD-ROM, a DVD-ROM, or a BD to the disk (108) or to load any data readable from a CD-ROM, a DVD-ROM, or a BD into the main memory (103) or the disk (108), if necessary.

A communication interface (114) may be based on, for example, but is not limited to, the Ethernet® protocol. The communication interface (114) may be connected to the bus (104) via a communication controller (113), physically connects the computer (101) to a communication line (115), and may provide a network interface layer to the TCP/IP communication protocol of a communication function of the operating system of the computer (101). In this case, the communication line (115) may be a wired LAN environment or a wireless LAN environment based on wireless LAN connectivity standards, for example, but is not limited to, IEEE® 802.11a/b/g/n ("IEEE" is a registered trademark of Institute of Electrical and Electronics Engineers, Inc. in the United States, other countries, or both).

Hereinafter, an embodiment of the present invention will be described with reference to the following FIGS. 2 to 7.

As stated above, there is a significant need to monitor the Face-to-face conversations.

Suppression of unwanted speech is the key factor for splitting a conversation into two tracks, since conversation usually proceeds alternately. However, it is difficult to completely suppress unwanted speech with a small number of microphones, because the spatial aliasing between the two speakers often causes post-filtering using the correlations among multiple channels to become inaccurate.

Further, there are retailed microphone arrays that have 4 to 16 elements. However, they are expensive and it is still difficult with such arrays to shut out sounds from non-subject speakers completely.

Accordingly, the idea of an embodiment of the present invention is on the basis of extension of the post filtering approach in a probabilistic framework integrating the aliasing metric and speech model.

Figure 2:
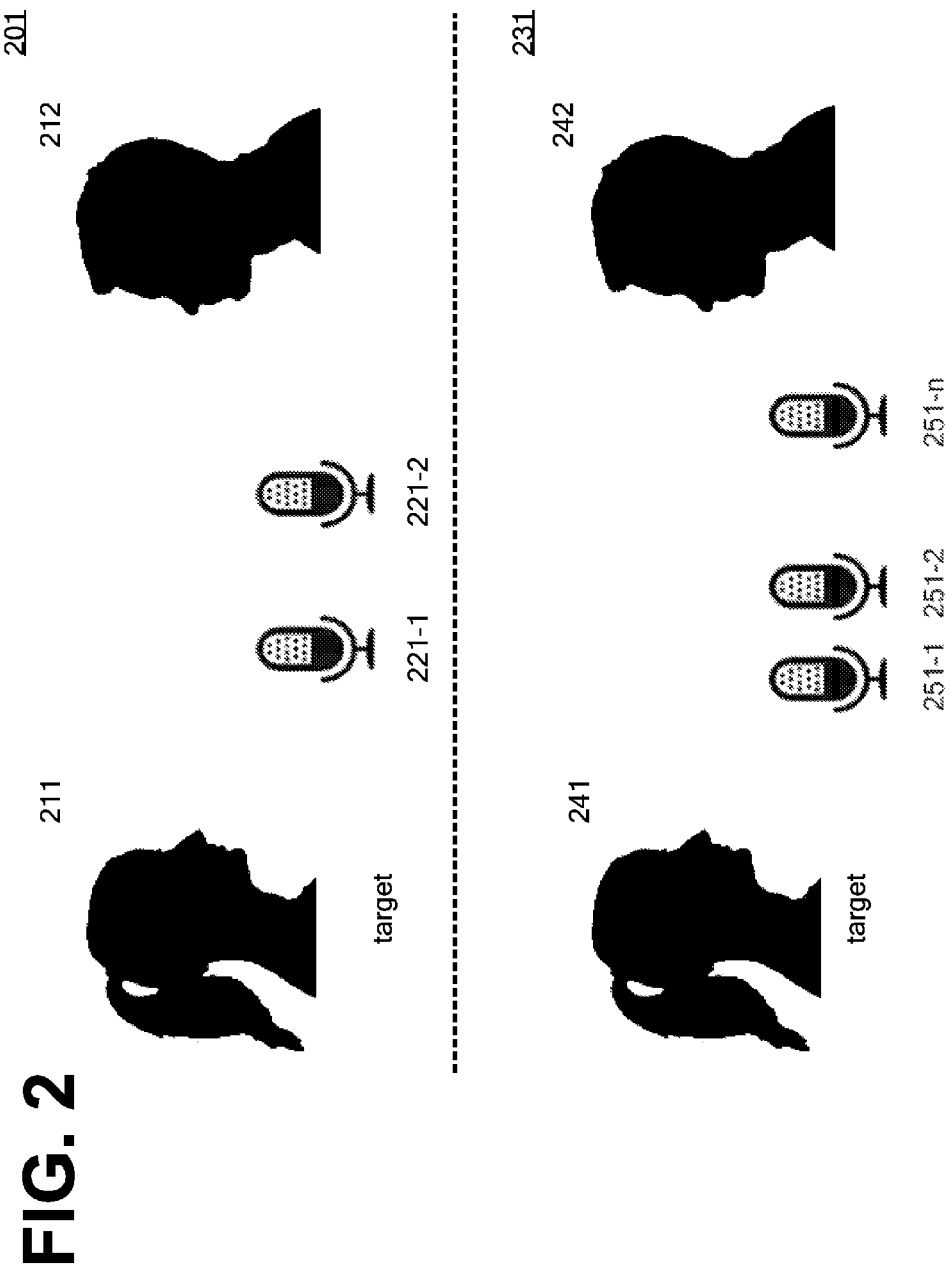
FIG. 2 illustrates examples of microphones placed between two speakers, according to an embodiment of the present invention.

With reference now to FIG. 2, FIG. 2 illustrates two examples of microphones which were placed between two speakers.

FIG. 2 illustrates two scenarios: the upper part (201) shows that two speech input devices are installed, and the lower part (231) shows that three or more speech input devices are installed. The speech input device may be, for example, a microphone. In the following, the term, "a microphone" is used instead of the speech input device, but this does not mean that the speech input device is limited to a microphone.

In the upper part (201), two microphones (221-1, 221-2) are placed between a target speaker (211) and an interfering speaker (212). The target speaker may be, for example, but not limited to, an agent in a company. The interfering speaker (212) may be, for example, but not limited to a customer of the agent.

In the lower part (231), three or more microphones (251-1, 251-2, . . . , 251-n) are placed between a target speaker (241) and an interfering speaker (242). The distance between suitable microphone intervals may be determined as similar manner mentioned.

With reference now to FIGS. 3A to 3D, FIGS. 3A to 3D illustrates one embodiment of a flowchart of an overall process for extracting target speeches from a plurality of speeches coming from different directions of arrival.

Figure 3A:
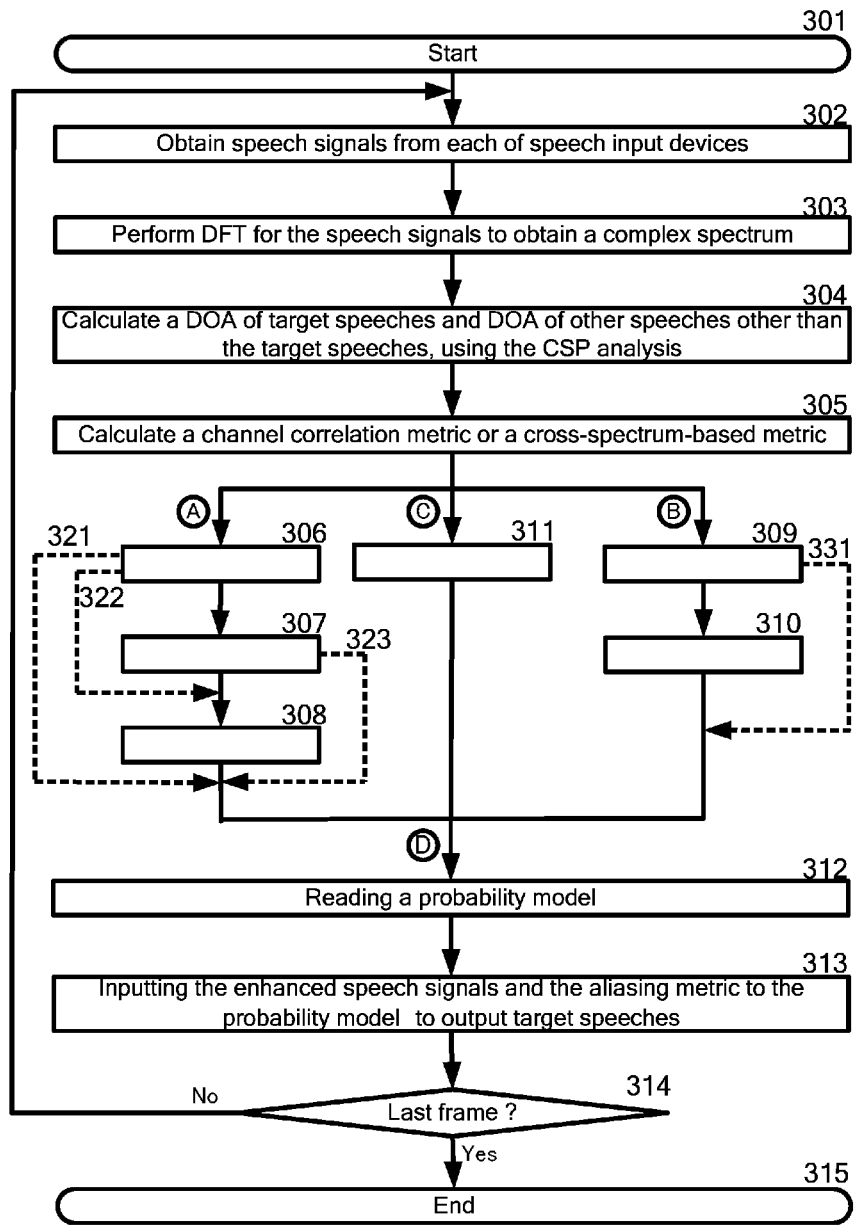
FIGS. 3A to 3D illustrate one embodiment of a flowchart of an overall process for extracting target speeches from a plurality of speeches coming from different directions of arrival, according to an embodiment of the present invention.
Figure 3B:
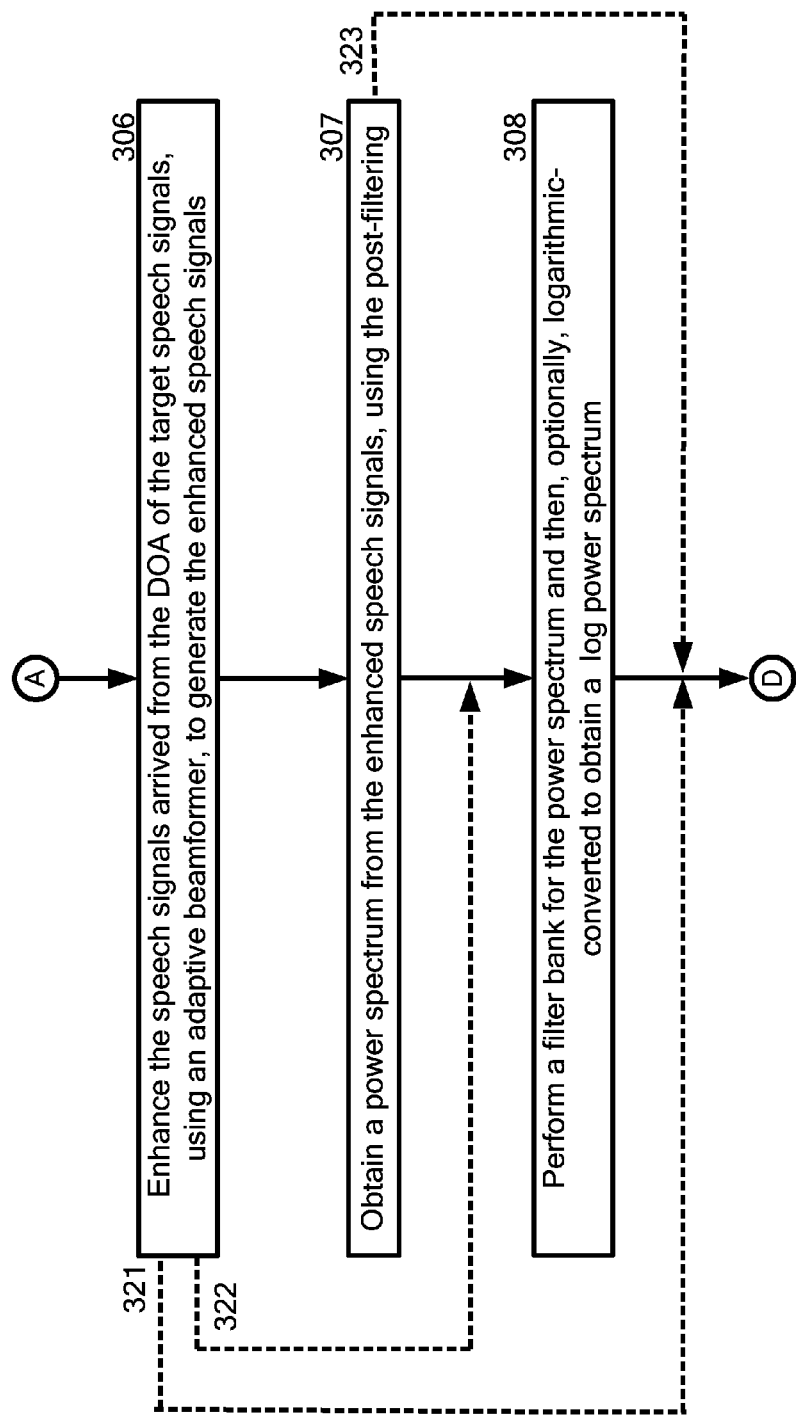
Figure 3C:
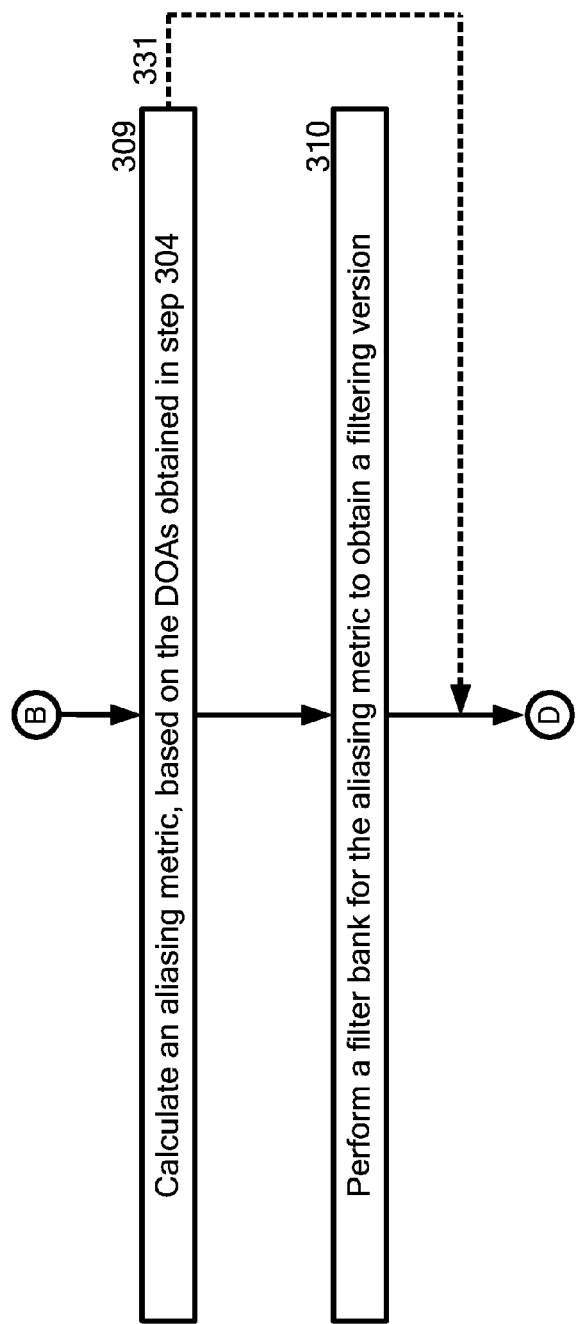
Figure 3D:
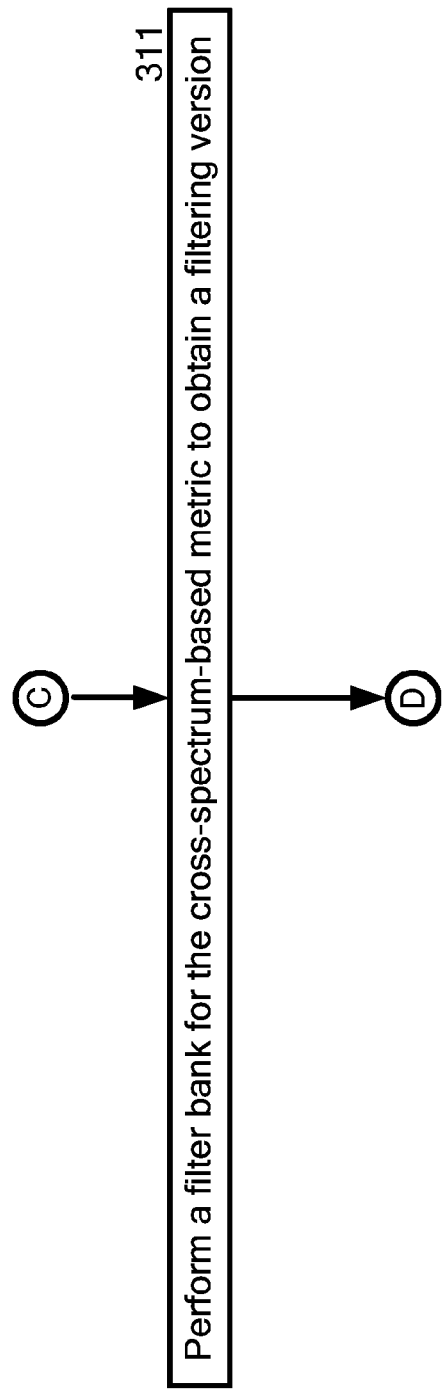

FIG. 3A illustrates one embodiment of a flowchart of an overall process. FIG. 3B illustrates a detail of the steps 306 to 308 described in FIG. 3A. FIG. 3C illustrates a detail of the steps 309 to 310 described in FIG. 3A. FIG. 3D illustrates a detail of the step 311 described in FIG. 3A.

A system such as the computer (101) performs each steps described in FIGS. 3A to 3C. The system may be implemented as a single computer or plural computers.

In step 301, the system starts the process mentioned above.

In step 302, the system obtains speech signals from each of speech input devices disposed apart in predetermined distances from one another.

In step 303, the system performs a discrete Fourier transform (DFT) for the obtained speech signals to obtain a complex spectrum.

In step 304, for each of the all possible pairs of the speech input devices, the system calculates, based on the obtained speech signals, a direction of arrival (DOA) of target speeches and directions of arrival (DOA) of other speeches other than the target speeches.

In an optional step 305, for each of the all possible pairs of the speech input devices, the system may calculate, based on the obtained speech signals, a channel correlation metric which represents a degree of correlation between the speech input devices, a cross-spectrum-based metric between the speech input devices, or combination of these.

The channel correlation can be calculated using any method known in the art, for example using the cross-power spectrum phase (CSP) analysis. If the number of the speech input devices is more than or equal to three, the correlation metrics for all pairs of the speech input devices are averaged and then used in a post filter in step 307 or input to the probability model described in step 312.

The cross-spectrum-based metric can be calculated using any method known in the art. For example, cross-spectrum-based metric is calculated as the transfer function in the following non-patent literature, Zielinski, "A microphone array with adaptive post-filtering for noise reduction in reverberant rooms," Proceedings of IEEE International Conference on Acoustics, Speech and Signal Processing (ICASSP), pp. 2578-2581, 1988".

In step 306, the system enhances, based on the speech signals and the direction of arrival of the target speeches, the speech signals arrived from the direction of arrival of the target speech signals, using an adaptive beamformer, to generate the enhanced speech signals.

The output of the step 306 may be used in step 307 for obtaining a power spectrum from the output, directly used in step 308 (see step 322) for performing a filter bank for the output, or directly input to the probability model described in step 322 (see step 321).

In an optional step 307, the system may obtain a power spectrum from the enhanced speech signal, using the post filtering, for example, Zelinski's post-filter.

The output of the step 307 may be used in step 308 for performing a filter bank for the output, or directly input to the probability model described in step 322 (see step 323).

In an optional step 308, the system may perform a filter bank, for example, the Mel-filter bank, for the power spectrum to obtain a log power spectrum, for example, a log-Mel power spectrum. The output of the filter bank may be further logarithmic-converted.

In step 309, for each pair of the speech input devices, the system calculates an aliasing metric, based on the direction of arrival of the target speeches and the directions of arrival of the other speeches. The aliasing metric indicates which frequency band of speeches is susceptible to spatial aliasing. If the number of the speech input devices is more than or equal to three, the calculated aliasing metrics are averaged and then processed using a filter bank in step 310, or directly input to the probability model described in step 312 (see step 331).

The output of the step 309 may be used in step 310 for performing a filter bank to obtain a filtering version of the aliasing metric, or directly input to the probability model described in step 312 (see step 331).

In an optional step 310, the system may perform a filter bank, for example, the Mel-Filter bank, for the aliasing metric to obtain a filtering version of the aliasing metric, for example, the Mel-filtering version of the aliasing metric.

In an optional step 311, the system may perform a filter bank, for example, the Mel-Filter bank, for the cross-spectrum-based metric to obtain a filtering version of the channel correlation metric, for example, the Mel-filtering version of the channel correlation metric. The step 311 must be performed when the Zelinski's post-filter as the post filtering is used in the step 307.

In step 312, the system reads, into a memory, a probability model which is the product of a first normal distribution and a second normal distribution. The first normal distribution is a model which has learned features of clean speeches. The second normal distribution is a model which has a mean in the probability distribution of the enhanced speech signals. The details of the first normal distribution and the second normal distribution will be explained below by referring the FIGS. 4A and 4B.

In step 313, the system inputs the enhanced speech signals and the aliasing metric to the probability model to output target speeches.

The second normal distribution is made so as to have a variance smaller than that of the first normal distribution in a case where the aliasing metric is close to zero.

Further, the second normal distribution may be made so as to have a variance smaller than that of the first normal distribution in a case where the channel correlation metric or the cross-spectrum-based metric is close to one.

Further, the second normal distribution may be made so as to have a variance larger than that of the first normal distribution in a case where the aliasing metric is close to one.

Further, the second normal distribution may be made so as to have a variance larger than that of the first normal distribution in a case where the channel correlation metric or the cross-spectrum-based metric is close to zero.

Due to the modification of the variance for the second normal distribution, the probability model having natural continuity in each of the frequency bands of the speech can be realized.

In step 314, the system judges whether time-frame now processed is a last frame or not. If the judgment is positive, the system proceeds to a final step 315. Meanwhile, if the judgment is negative, the system proceeds back to step 302 and then repeats the steps 302 to 314.

In step 315, the system terminates the process mentioned above.

Please note that the steps 306 to 308 and the steps 309 and 310 can be performed simultaneously or in parallel.

Further, please note that the steps 306 to 308, the steps 309 and 310 and step 311 can be performed simultaneously or in parallel.

Figure 4A:
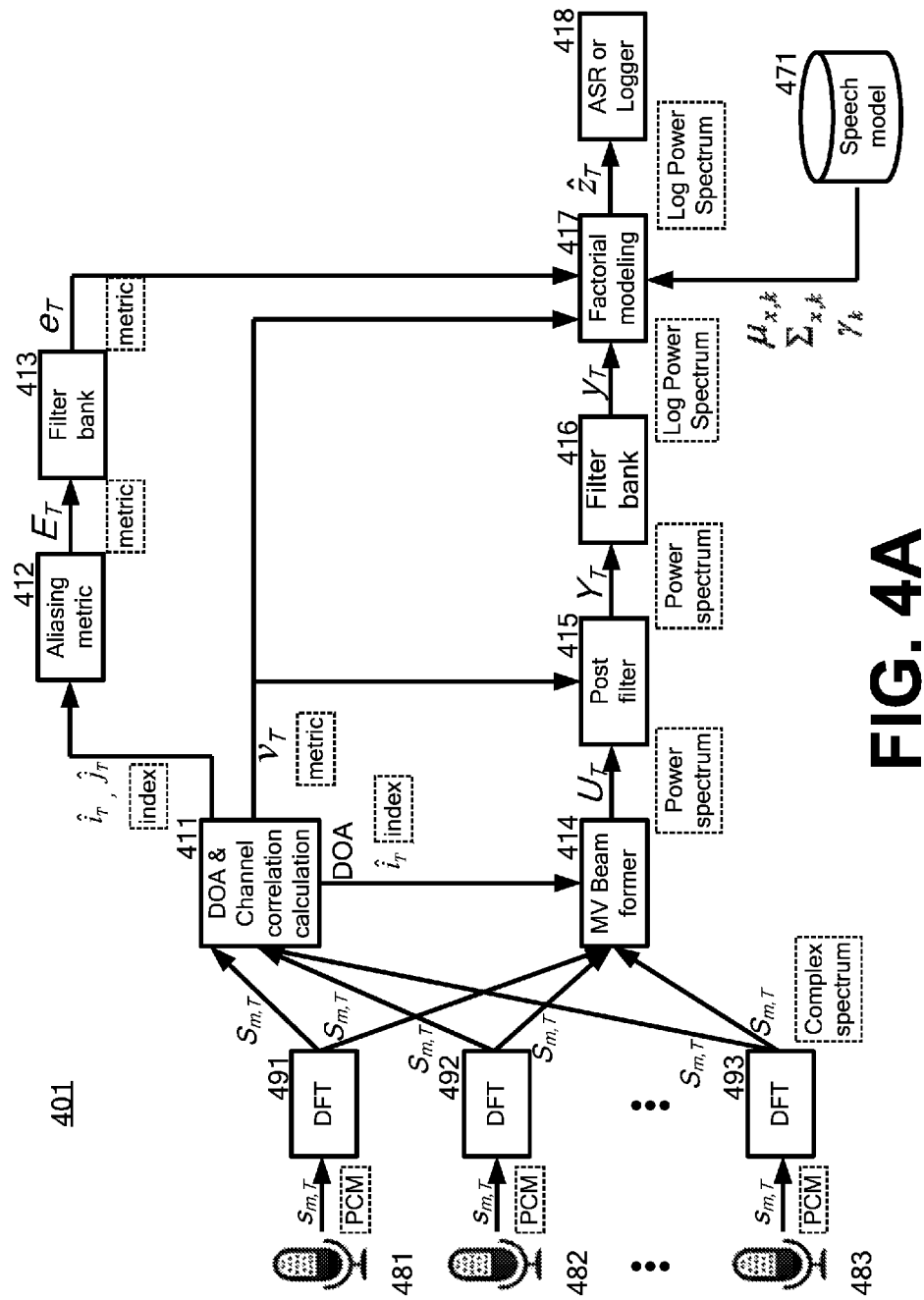
FIG. 4A illustrates one embodiment of a block diagram of the system, according to an embodiment of the present invention.
Figure 4B:
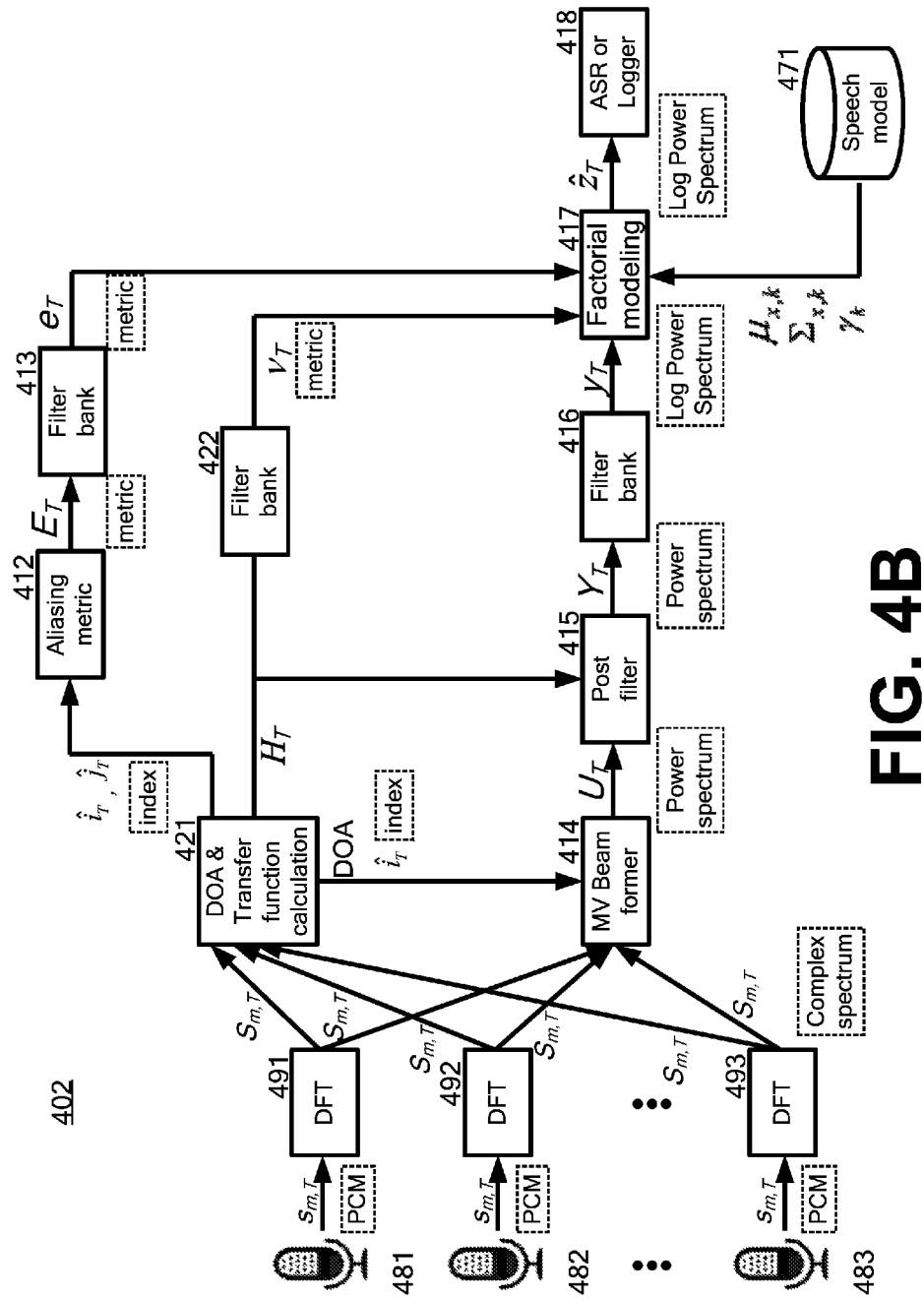
FIG. 4B illustrates another embodiment of a block diagram of the system, according to an embodiment of the present invention.

With reference now to FIGS. 4A and 4B, FIGS. 4A and 4B illustrate embodiments of a block diagram of the system.

FIG. 4A and FIG. 4B each describes a system according to an embodiment of the present invention.

Each of the systems (401, 402) can be used for extracting target speeches from a plurality of speeches coming from different directions of arrival. Each of the systems (401, 402) may be the computer (101) described in FIG. 1.

The system (401) comprises discrete Fourier transform (DFT) sections (491, 492, . . . , 493), a directions of arrival (DOA) & Channel correlation (CC) calculation section (411), an aliasing metric section (412), a filter bank section (413), a minimum variance beamformer (MVBF) section (414), a post filter section (415), a filter bank section (416), a factorial modeling section (417) and an ASR or logger section (418).

The system (402) comprises the common sections (491, 492, . . . , 493 and 412 to 418) as described in FIG. 4A. The system (402) further comprises a DOA & Transfer function (TF) calculation section (421) instead of DOA & CC calculation section (411) and further comprises an additional filter bank section (422). As stated below, when Zelinski's post-filter is used in the post filter (415), the system (402) is selected.

In the following, each of the common sections (491, 492, . . . , 493 and 412 to 418) which are commonly comprised in each of the systems (401, 402), the DOA and CC calculation section (411) which are comprised in the system (401), and the DOA & TF calculation section (421) and the additional filter bank section (422) which are comprised in the system (402) will be explained.

Each of the common sections (491, 492, . . . , 493 and 412 to 418), the DOA and CC calculation section (411), and the DOA & TF calculation section (421) and the additional filter bank section (422) may perform the steps described in FIG. 3A, as mentioned below.

The discrete Fourier transform (DFT) sections (491, 492, ..., 493) may perform the steps 302 and 303.

The DOA & CC calculation section (411) may perform the steps 304 and calculate a channel correlation metric as described in step 305. The DOA & TF calculation section (421) calculate a cross-spectrum-based metric as described in step 305.

The minimum variance beamformer (MVBF) section (414) may perform step 306.

The post filter section (415) may perform the step 307.

The filter bank section (416) may perform step the 308.

The aliasing metric section (412) may perform the step 309.

The filter bank section (413) may perform step 310.

The filter bank section (422) may perform step 311.

The factorial modeling section (417) may perform the steps 312 and 313.

In the following, the processing details carried out by each section (412 to 418 and 491 to 493) the DOA and CC calculation section (411), the DOA & TF calculation section (421) and the additional filter bank section (422) will be described.

Let us suppose that plural microphones (481, 482, ..., 483) are disposed apart in predetermined distances from one another between a target speaker and an interfering speaker.

Each of the microphones (481, 482, ..., 483) receives speech signals from the target and the customer. Each of the microphones (481, 482, ..., 483) transmits the speech signals, $s_{m,T}$, to the system (401). Here, m denotes the number of the m-th microphones, and T denotes time-frame number index. Accordingly, the speech signal, $s_{m,T}$, may be a time domain signal in one frame at m-th microphone for all m.

Each of the DFT sections (491, 492, ..., 493) may receive speech signals, $s_{m,T}$, from the corresponding microphones (481, 482, ..., 483). The number of DFT sections (491, 492, ..., 493) may correspond to those of the microphones (481, 482, ..., 483).

Each of the DFT sections (491, 492, ..., 493) then perform a discrete Fourier transform (DFT) for the speech signals, $s_{m,T}$, at the m-th microphone to obtain a complex spectrum, $S_{m,T}$. The complex spectrum, $S_{m,T}$ can be expressed as $S_{m,T}(n)$. The complex spectrum, $S_{m,T}(n)$, can be observed in the m-th microphone at the time-frame T in n-th DFT bin.

Each of the DFT sections (491, 492, ..., 493) may transmit the complex spectrum, $S_{m,T}$, to the DOA & CC calculation section (411) or the DOA & TF calculation section (421).

In the following, common processes performed by the DOA & CC calculation section (411) and the DOA & TF calculation section (421) will be described.

The DOA & CC calculation section (411) or the DOA & TF calculation section (421) each may estimate DOA and calculate a gain for a post filter, using for example, a CSP analysis. The DOA & CC calculation section (411) or the DOA & TF calculation section (421) carry out the CSP analysis for each complex spectrum, $S_{m,T}$. The DOA & CC calculation section (411) or the DOA & TF calculation section (421) may calculate, for each frame, a CSP coefficient in order to estimate directions of arrival (DOA) and calculate a gain for a post filter. The CSP coefficient ϕ may be calculated for all the possible microphone pairs (l, m), according to the following equation (1).

$$\varphi_{T,l,m}(i) = IDFT\left[W_T(n) \cdot \frac{S_{l,T}(n) \cdot S_{m,T}(n)^*}{|S_{l,T}(n)| \cdot |S_{m,T}(n)|}\right] \quad (1)$$

where $\phi_T$ (i) denotes a CSP coefficient; i denotes a time-domain index; $W_T$ (n) denotes a weigh of each DFT bin; n denotes the DFT bin number; and * denotes a complex conjugate.

Accordingly, if two microphones are used, the equation (1) mentioned above may be rewritten as the following equation (1a).

$$\varphi_T(i) = IDFT\left[W_T(n) \cdot \frac{S_{1,T}(n) \cdot S_{2,T}(n)^*}{|S_{1,T}(n)| \cdot |S_{2,T}(n)|}\right] \quad (1a)$$

The CSP coefficient is a representation of the cross-power spectrum phase analysis in a time region and denotes a correlation coefficient corresponding to a delay of i-sample.

In one embodiment, the CSP coefficient, $\phi_T$, may be a moving average over few frames back and forth in order to obtain stable expression. In another embodiment, the CSP coefficient, $\phi_T$, may be given as $\phi_T(\hat{i}_T)$, which is a CSP-target, i.e. a CSP coefficient of a direction of the target speaker.

In one embodiment, $W_T$ (n) is normally set to one when the weigh is not used in a normal CSP analysis. In another embodiment, a weighted CSP, which is arbitrary weight value, may be used as $W_T$ (n). The weighted CSP can be calculated, for example, according to an embodiment of the invention described in the U.S. Pat. No. 8,712,770.

Value maximizing ϕ gives the target speaker direction, $\hat{i}_T$, and the interfering speaker direction $\hat{j}_T$. The target speaker direction, $\hat{i}_T$, corresponds to a direction of arrival of target speeches. A range where the target speaker may exist is limited to either of a left or right side. The interfering speaker direction $\hat{j}_T$, corresponds to directions of arrival of other speeches other than the target speeches. A range where the interfering speaker may exist is limited to opposite side of the target speaker.

A DOA index, $\hat{i}_T$, of the target speaker can be estimated, according to the following equation (2), as a point which gives a peak in a side of the target speaker. The DOA index, $\hat{i}_T$, of the target speaker may be calculated for each of the all possible pairs of the microphones.

$$\hat{i}_T = \text{argmax}(\bar{\phi}_T(i)),$$

$$0 < i < i_{max} \quad (2)$$

A DOA index, $\hat{j}_T$, of the interfering speaker can be estimated as similar that used for estimating the DOA index, $\hat{i}_T$, of the target speaker. The DOA index, $\hat{j}_T$, of the interfering speaker may be calculated for each of the all possible pairs of the microphones.

The DOA index, $\hat{i}_T$, can be used as DOA in the MVBF section (414) and, therefore, will be passed to the MVBF section (414).

The DOA indexes, $\hat{i}_T$ and $\hat{j}_T$, can be used in the aliasing metric section (412) and, therefore, will be passed to the aliasing metric section (412).

In the following, the processes performed by the DOA & CC calculation section (411) will be first described.

The DOA & CC calculation section (411) may calculate a channel correlation metric, V T, for all the possible microphone pairs (l, m). The channel correlation metric represents a degree of correlation between the microphones.

The channel correlation metric, $v_T$, can be calculated according to the following equation (3), when the number of microphones is three or more. When the number of microphones is three or more, in the equation (3), the CSP-target is set, to an average of the $\bar{\varphi}_{l,m}(\hat{i}_{l,m})$ which are calculated for all the possible microphone pairs (l, m).

$$v = \max\left(0, \frac{2}{M(M-1)}\sum_{l<m} \bar{\varphi}_{l,m}(\hat{i}_{l,m})\right) \quad (3)$$

where v denotes channel correlation metric which is calculated for all the possible microphone pairs (l, m). The suffix of the frame number, T, is omitted in the equation (3).

The channel correlation metric, v, can be calculated according to the following equation (3a), when the number of microphones is two.

$$vT = \max(0, \bar{\varphi}_T(\hat{i}_T)) \quad (3a)$$

The process performed by the DOA & TF calculation section (421) will be later described after the explanation of the post-filtering processing performed by the post-filter section (415).

The aliasing metric section (412) may calculate an aliasing metric, $E_T$, based on the direction of arrival of the target speeches and the directions of arrival of the other speeches. The aliasing metric can be calculated according to the following equations (4) and (5), when the number of microphones is three or more. When the number of microphones is three or more, an average of the aliasing metric for all the possible microphone pairs (l, m) is used.

$$E_{l,m}(n) = \cos(2\pi \cdot n \cdot (\hat{i}_{l,m} - \hat{j}_{l,m})/N) \quad (4)$$

$$E(n) = \frac{2}{M(M-1)}\sum_{l<m} E_{l,m}(n) \quad (5)$$

where N denotes the total number of the DFT bin; $\hat{i}_{l,m}$ denotes a DOA index for the target speaker when seen from the microphone pair (l, m); and $\hat{j}_{l,m}$ denotes a DOA index for the interfering speaker when seen from the microphone pair (l, m). The suffix of the frame number, T, is omitted in the equations (4) and (5).

Figure 5:
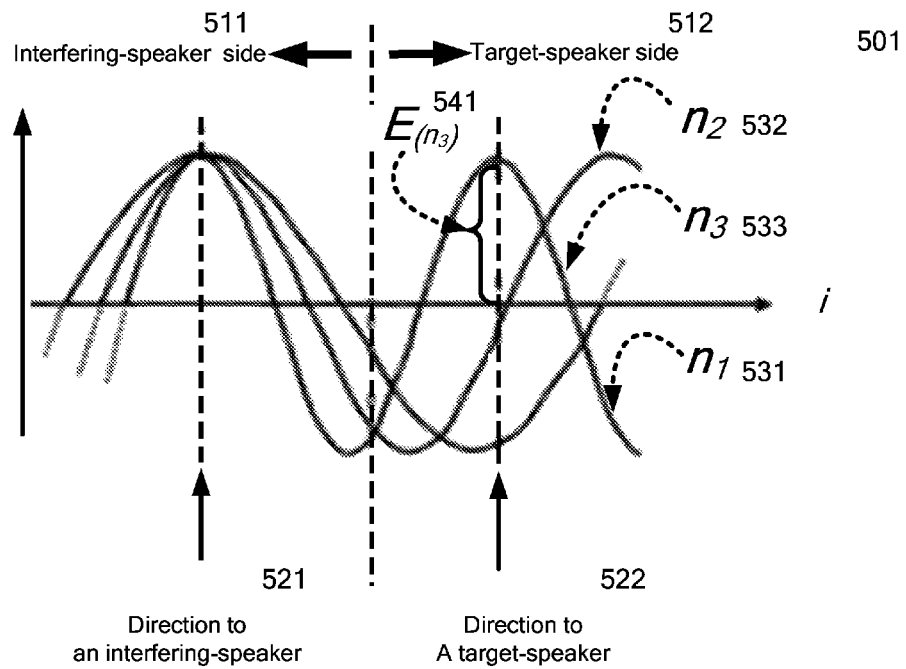
FIG. 5 illustrates an example of an aliasing metric and an aliasing metric, according to an embodiment of the present invention.
Figure 5:
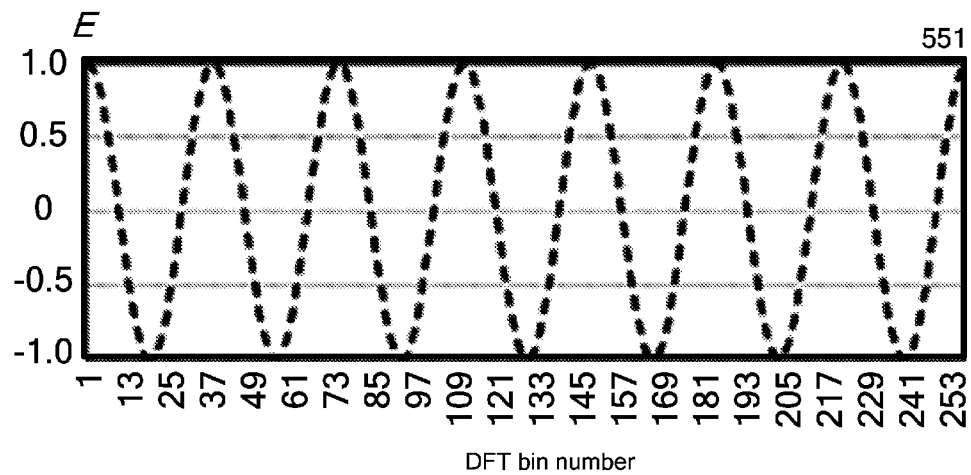

With reference now to the upper part (501) in FIG. 5, sound waves (531, 532, 533) are shown. In a case where $E_{l,m}(n)$ (see 541) is large, the sound wave (531) at the target-speaker direction (522) has the similar phase to the one at the interfering speaker direction (521) for the n-th DFT bin. Because MVBF and post-filter work based on the phase information, they confuse the sound from the interfering-speaker side (511) with the sound from the target-speaker side (512). That means that E(n) can be treated as the confidence metric of MVBF and post-filter. In a case where E(n) is large, the n-th DFT bin has lower confidence in the output of MVBF and post-filter.

With reference now to the lower part (551) in FIG. 5, an example of the aliasing metric is shown by the dashed line. The vertical axis denotes the aliasing metric E(n) and the horizontal axis denotes the DFT bin number. This indicates lower-confidence regions are observed at regular intervals in the frequency depending on the directions of the interfering-speaker and the target-speaker.

With reference now back to FIGS. 4A and 4B, the aliasing metric, E(n), will be passed to the filter bank section (413) in order to carry out a filter bank processing, where d denotes an index of the filter bank.

The filter bank section (413) may calculate a filtering version, $e_d$, of the aliasing metric, E(n), using the filter bank, for example, Mel-filtering-bank. The aliasing metric, E(n), is reduced to the lower dimensional signal, $e_d$.

The filtering version, $e_d$, of the aliasing metric, $E_d$, can be calculated, according to the following equation (6). The filtering version, $e_d$, may be a Mel-band-pass filtered version of the aliasing metric, $E_d$.

$$e_d = \sum_n \max(0, E(n)) \cdot B_{d,n} \bigg/ \sum_{n'} B_{d,n'} \quad (6)$$

where $B_{d,n}$ is a distribution of the d-th filter in the n-th bin.

The output, $e_d$, will be passed to the factorial modeling (417).

The MVBF section (414) enhancing the speech signals arrived from the direction of arrival of the target speech signals, based on the speech signals and the direction of arrival of the target speeches, to generate the enhanced speech signals. In detail, the MVBF section (414) receives the DOA index, $\hat{i}_T$, and then carry out the MVBF in order to obtain an output of the adaptive beamformer, $U_T$. The MVBF minimizes ambient noise by maintaining a constant gain in the target direction. The output of the adaptive beamformer, $U_T$, is a power spectrum. The MVBF is described, for example, by the following non-patent literature, F. Asano, H. Asoh, and T. Matsui: "Sound source localization and separation in near field", IEICE Trans., E83-A, No. 11, pp. 2286-2294, 2000. The power spectrum, $U_T$, will be passed to the post-filter section (415).

The post-filter section (415) carries out the post-filtering processing for the power spectrum, $U_T$, in order to obtain an output of the post-filter, $Y_T$.

In one embodiment of the post-filtering processing, the power spectrum, $Y_T$, can be calculated according to the following equation (7). This embodiment is only applied for the system (401) described in FIG. 4A. In this embodiment, the value common to all frequencies can be obtained.

$$Y_T(n) = vT \cdot U_T(n) \quad (7)$$

where $v_T$ denotes a channel correlation metric.

In another embodiment of the post-filtering processing, the power spectrum, $Y_T$, can be filtered per spectral bin as Zelinski's post-filter does. This another embodiment is only applied for the system (402) described in FIG. 4B. Zelinski's post-filter is described, for example, by the following non-patent literature, Zielinski, "A microphone array with adaptive post-filtering for noise reduction in reverberant rooms," Proceedings of IEEE International Conference on Acoustics, Speech and Signal Processing (ICASSP), pp. 2578-2581, 1988". In this embodiment, the value in each frequency band can be obtained.

The transfer function H of Zelinski's post-filter is represented as the following equation (8).

$$H(n) = \left[\frac{2}{M(M-1)}\sum_{l=m}^{M-1}\sum_{m=l+1}^{M} \Re\{\hat{\phi}_{l,m}(n)\}\right] \bigg/ \left\{\frac{1}{M}\sum_{l=1}^{M} \hat{\phi}_{l,l}(n)\right\} \quad (8)$$

where $\hat{\phi}_{i,j}(n)$ is a smoothed auto- or cross-spectral density between the microphones on channels i and j for DFT bin n; and $\Re$ is a function for extracting the real part of the complex number. The suffix of the frame number, T, is omitted in the equation (8).

In the equation (8), $\hat{\phi}_{i,j}$ is calculated as a local average around frame T, according to the following equation (9).

$$\hat{\phi}_{(T),i,j}(n) = \frac{1}{(2L+1)} \sum_{l=-L}^{L} \phi_{(T+l),i,j}(n). \quad (9)$$

The cross-spectral density is calculated after steering, according to the following equation (10).

$$\phi_{(T),1,2}(n) = S_{(T),1}(n) \cdot \{S_{(T),2}(n) \cdot e^{i\tau}\}^* \quad (10)$$

where $S_{T,i}$ is the complex spectrum of the observation at microphone i, and $\tau$ is given by the following equation (11).

$$\tau = 2\pi \cdot \hat{i}_T \cdot n/M. \quad (11)$$

where $\hat{i}_T$ is the DOA index for the target speaker, determined by CSP analysis, and M is the DFT size.

The output is then calculated, according to the following equations (12) and (13).

$$H_T'(n) = \max(H_T(n), 0.0) \quad (12)$$

$$Y_T(n) = H_T'(n) \cdot U_T(n) \quad (13)$$

Please note that an only non-negative value is taken, as $U_T$ is the power spectrum of the MVBF output.

The output, $Y_T$, from the post-filter section (415) will be passed to the filter bank section (416) in order to carry out a filter bank processing.

The filter bank section (416) may calculate a filtering version of the output, $Y_T$, using the filter bank, for example, Mel-filtering-bank, and the output is logarithmic-converted to obtain $y_t$. The obtained $y_t$ is log power spectrum, for example, log Mel-power spectrum.

The obtained y is actually pre-processed with the gain adaptation so as to maximize the total likelihood of the utterance. This is because a Gaussian mixture model (GMM) in the log-mel spectrum domain has dependency on the input gain.

The obtained $y_t$ from the filter bank section (416) will be passed to the factorial modeling section (417).

The following descriptions relating to each of the DOA & TF calculation section (421) and the filter bank (422) described in FIG. 4B are applied only for the system (402).

In a case where Zelinski's post-filter is used, the channel correlation metric, V T, must be calculated as cross-spectrum-based metric.

The DOA & TF calculation section (421) calculates a cross-spectrum-based metric, $H_T$, for all the possible microphone pairs (l, m). The cross-spectrum-based metric, $H_T$, can be calculated according to the equation (8) mentioned above. Ht is the same as H(n), but (n) corresponding to the index(n) is omitted here.

The filter bank (420) may calculate a filtering version of the output, $H_T$, using the filter bank, for example, Mel-filtering-bank. Accordingly, the obtained the cross-spectrum-based metric, $v_T$, is a Mel-filter version of $H_T$. The output, $v_T$, form the filter bank (420) can be calculated according to the following equation (14).

$$v_d = \max\left(0, \sum_n H(n) \cdot B_{d,n} \Big/ \sum_{n'} B_{d,n'}\right). \quad (14)$$

where H(n) is calculated by the equation (8) mentioned above, and $B_{d,n}$ is a distribution of the d-th filter in the n-th bin. The suffix of the frame number, T, is omitted in the equation (14). Further, the suffix of the filter bank, d, will be omitted in the following sections for simplicity.

The factorial modeling section (417) is one key feature of an embodiment of the present invention. In the factorial modeling section (417), a factorial model comprising two factors is introduced. The factorial model is a probability model which is the product of a first normal distribution and a second normal distribution. The factorial model is represented as the following equation (15). Herein after, the suffix, T, is omitted.

$$p(z|y,e,v) \propto p(z|y) \cdot p(z|e,v) \quad (15)$$

where y denotes the output from the filter bank section (416); e denotes the output from the filter bank section (413); v denotes the channel correlation metric from the DOA & Transfer function calculation section (411); z denotes the output of the factorial modeling section (417). The first normal distribution is represented as a model, p(z|y). The first normal distribution, p(z|y), is a model which has learned features of clean speeches. The clean speeches may be obtained in a quiet room. For example, the first normal distribution, p(z|y), may be probabilistic distribution of estimated clean speech z based on the output y from the filter bank section (416). The first normal distribution, p(z|y), is in advance trained as Gaussian Mixture Model, using clean speech data (471).

The second normal distribution, is represented as a model, p(z|e,v). The second normal distribution model is a model having a mean in the probability distribution of the enhanced speech signals. In detail, the second normal distribution model may be probabilistic distribution of estimated clean speech z based on the confidence metric calculated with the filtering version, e, of the aliasing metric and the channel correlation metric, v. The second normal distribution model is designed as a set of Gaussian distribution each associated with the components of the first normal distribution model. The second normal distribution model has higher probability of z at the current y. Its variance is designed to be small when the confidence metric is high, and to be large when the confidence metric is low. This controls the product distribution shifted more to the model-based value when the confidence is low and more to y (pass-through) when the confidence is high. Further, the band with higher confidence contributes more for the total probability.

The distribution of the product probability, p(z|e,v,y), can be Gaussian mixture model (GMM), because the product of the two Gaussian distribution, i.e. the first normal distribution and a second normal distribution, is also Gaussian distribution.

The first normal distribution model is given as the following equation (16).

$$p(z|y) = \sum_{k}^{K} \rho_k(y) \cdot N(z; \mu_{x,k}, \Sigma_{x,k}) \quad (16)$$

where k denotes each index in the mixed normal distribution; and N denotes a normal distribution; μ denotes a mean vector, Σ denotes a variance-covariance matrix and a diagonal covariance matrix may be used. μ, $\Sigma_{x,k}$ and γ are given at each k-th Gaussian. $\rho_k(y)$ is a posterior probability that k-th normal distribution is selected when y is observed. The posterior probability, $\rho_k(y)$, is given as the following equation (17).

$$\rho_k(y) = \gamma_k \cdot N(y; \mu_{x,k}, \Sigma_{x,k}) \Big/ \sum_{k'} \gamma_{k'} \cdot N(y; \mu_{x,k'}, \Sigma_{x,k'}) \quad (17)$$

where γ is the prior probability of the clean speech.
The second normal distribution is given as the following equation (18).

$$p(z|e,v) = N(z; y, \psi(e,v)) \quad (18)$$

where ψ is created by scaling each component in the variance-covariance matrix for the clean speech model. The scaling is set to smaller value in a case where the aliasing metric, e, has a value closer to zero or the channel correlation metric, v, or a cross-spectrum-based metric is close to one.

The variance, ψ, is designed as the scaled version of Σ. The scaling is performed with the parameters, e, v, or combination of these. For example, the variance, ψ, can be calculate, according to the following equations (19), (20), (21) and (22), by scaling the k-th Gaussian at the d-th band in the speech model. In the following equations (19), (20), (21) and (22), α, β and γ each denote a constant and E is a very small vale in order to avoid zero.

$$\psi_{k,d} = \Sigma_{x,k,d} \cdot \beta \cdot (e_d + (1-v) + \epsilon) \quad (19)$$

$$\psi_{k,d} = \Sigma_{x,k,d} \cdot \beta \cdot (1 - \sqrt{v(1-e_d)} + \epsilon) \quad (20)$$

$$\psi_{k,d} = \Sigma_{x,k,d} \cdot \beta \cdot (e_d + \epsilon) \quad (21)$$

$$\psi_{k,d} = \Sigma_{x,k,d} \cdot \beta \cdot (1 - 1/(1+\exp(-\alpha(e_d - \gamma))))^{-1} \quad (22)$$

Accordingly, the distribution of the product probability, p(z|e,v,y), can be expressed as the following equation (23).

$$P(z|y,e,v) = \sum_k^K Z_k^{-1} \rho_k'(y,e,v) \cdot N(z; \mu_{x,k}, \Sigma_{x,k}) \cdot N(z; y, \psi_k(e,v)) = \sum_k^K Z_k^{-1} \rho_k'(y,e,v) \cdot N(z; \mu_{z,k}', \Sigma_{z,k}') \quad (23)$$

where $Z_k$ is a normalization constant for setting the integral of the probability distribution to one.

The means, $\mu_{z,k}'$, and the variances, $\Sigma_{z,k}'$, of the distribution of the product probability, p(z|e,v,y), are given by the following equations (24) and (25), respectively.

$$\mu_{z,k}' = \Sigma_{z,k}'(\Sigma_{x,k}^{-1}\mu_{x,k} + \psi_k^{-1}y) \quad (24)$$

$$\Sigma_{z,k}' = (\Sigma_{x,k}^{-1} + \psi_k^{-1})^{-1} \quad (25)$$

where $\mu_{x,k}$ is the mean of the clean speech model, $\Sigma_{x,k}$ is the variance of the clean speech model. The mean, $\mu_{x,k}$, and the variance, $\Sigma_{x,k}$, are given in advance.

Further, the posterior probability, $\rho_k(y)$, of the k-th normal distribution is expanded to, $\rho_k'(y,e,v)$. The expanded posterior probability, $\rho_k'(y,e,v)$, are given as the following equation (26).

$$\rho_k'(y,e,v) = \gamma_k \cdot N(y; \mu_{z,k}', \Sigma_{z,k}') \Big/ \sum_{k'} \gamma_{k'} \cdot N(y; \mu_{z,k'}', \Sigma_{z,k'}') \quad (26)$$

where $\gamma_k$ is the prior probability of the clean speech model. The prior probability, $\gamma_k$, is given in advance.

The variances, $\Sigma_{z,k}'$, used for the posterior probability, ρ', becomes smaller than the original variance, $\Sigma_{x,k}$, for the d-th band in a case where the aliasing metric, e, for the d-th frequency band has a value closer to zero or the channel correlation metric, v, or a cross-spectrum-based metric is close to one.

According to the equation (26), as stated above, in a case where the aliasing metric, e, for the d-th frequency band has a value closer to zero or the channel correlation metric, v, or a cross-spectrum-based metric is close to one, the variance, $\psi_{k,d}$, becomes smaller and the variance, $\Sigma_{z,k,d}'$, becomes smaller than the original variance, $\Sigma_{x,k,d}^{-1}$. This makes the d-th band Gaussian more sensitive, thus contribution of such frequency band becomes larger in the estimation of the posterior probability. Accordingly, the frequency band having high reliability can be actively utilized as a key. Further, according to the equation (26), for the frequency band, d, the average vector, $\mu_{z,k,d}'$, shifts to $y_d$, and the distribution of the product probability, p(z|e,v,y), is shifted closer to the second normal distribution. That is, the distribution of the product probability, p(z|e,v,y), is shifted from the model-estimated value toward the y from the filter bank section (416) in a case where the aliasing metric, e, has a value closer to zero or the channel correlation metric, v, or a cross-spectrum-based metric is close to one. This is because the second normal distribution is a model with a higher probability around z=y.

Meanwhile, confidence or reliability of such frequency band becomes smaller in the estimation of the posterior probability in a case where the aliasing metric, e, for the d-th frequency band has a value closer to one or the channel correlation metric, v, or a cross-spectrum-based metric is close to zero. This makes the d-th band Gaussian has larger variance, thus contribution of such frequency band becomes low in the estimation of the posterior probability. Further, for the frequency band, d, the average vector, $\mu_{z,k,d}'$, shifts to $\mu_{x,k,d}$, and the distribution of the product probability, p(z|e,v,y), is shifted closer to the first normal distribution, i.e. the distribution of the speech model (471). This makes compensation only for the degraded part.

The final estimated output, ẑ, from the factorial modeling section (417) can be obtained, using the minimum mean square error (MMSE). The final estimated output, ẑ, can be calculated according to the following equation (27).

$$\hat{z} \int z \cdot p(z|y,e,v)dz \cong \sum_k^K \rho_k'(y,e,v) \cdot u_{z,k}' \quad (27)$$

The final estimated output, ẑ, will be passed to the ASR or logger section (418). The ASR section (418) may output the final estimated output, ẑ, as a recognized result of the speech. The Logger section (418) may store the final estimated output, ẑ, into a storage, such as a disk (108) described in FIG. 1.

With reference now to FIG. 6, FIG. 6 illustrates experimental results according to one embodiment of the present invention.

In a small, quiet meeting room, two omni-directional microphones were placed on the table between two subject speakers, A and B. The distance between the microphones was 12 cm. The beamformer operated at a 22.05-kHz sampling frequency.

The two subject speakers alternately read 100 sentences written in Japanese and the speeches were recorded. Using the recorded speeches as test data, the mixed speech data as the evaluation data was generated. The mixed speech data simulates the simultaneous utterance between the two subject speakers. In details, part of speech segments obtained from the subject speaker A was extracted and scaled by 50%, then superimposed continuously to the speech segment obtained from the subject speaker B. The obtained hundred utterances were used for a target of the ASR. The speeches after the superposition were input to the adaptive beamformer and the post-filter and, after the processing, the utterance split was performed.

In this test data, there was almost no complete silence during the speaking of the subject speaker B. This means that mixed voice state continues during the speaking of the subject speaker B.

Therefore, only the speech segment of the subject speaker B was cut out in order to focus on the performance of simultaneous speech section. Accordingly, the evaluation using ASR was performed only for speaker B.

The experimental results are shown in Table 1 (601).

Table 1 (601) shows the Character Error Rate (CER) %. The speech recognition accuracy was evaluated by the CER.

Case 1 is a baseline of the evaluation, as a reference. Cases 2 to 4 are comparative examples. Case 5 is the Example according to an embodiment of the present invention.

Case 1: Case 1 was a baseline using the single microphone nearest to the subject speaker. The result of the CER, 62.1%, is very high.

Case 2: Case 2 is the simple MVBF system. It showed much improvement for the mixed speech, but little for the alternating speech. The MVBF achieved some speech separation in the mixed speech segments, but it did not sufficiently suppress the interfering speaker's speech. The effect of the MVBF was observed, but the result of the CER, 39.7%, is still high.

Case 3: Case 3 uses the Zelinski's post-filter. The Zelinski's post-filter was further applied the case 2. The effect of the Zelinski's post-filter was observed, but the result of the CER, 20.8%, is not still enough.

Case 4: The output of the case 3 was completely replaced with the estimation value of a clean speech model, $p(z|y)$.

Case 5: Case 5 was the system performing factorial modeling, according to an embodiment of the present invention. The output of the case 3 is set to v. Using the factorial modeling, the output of the case 3 was partially replaced by amending the data having low degree of the reliability with the data having high reliability. The CER was further reduced compared to case 4.

The present invention may be a method, a system, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

By the expression "comprise(s)/comprising a/one" should be understood as "comprise(s)/comprising at least one".

By the expression "comprise(s)/comprising" should be understood as "comprise(s)/comprising at least".

By the expression "/" should be understood as "and/or".

What is claimed is:

1. A method for extracting target speeches from a plurality of speeches originating from different directions of arrival, the method comprising:
    obtaining speech signals from each of a multiple of speech input devices disposed apart in predetermined distances from one another;
    calculating, based on the speech signals, a direction of arrival of target speeches and directions of arrival of other speeches other than the target speeches for each of at least one pair of speech input devices;
    calculating, for each of the at least one pair of speech input devices, an aliasing metric, based on the direction of arrival of the target speeches and the directions of arrival of the other speeches, wherein the aliasing metric indicates which frequency band of speeches is susceptible to spatial aliasing;
    enhancing, using an adaptive beamformer, speech signals arrived from the direction of arrival of the target speech signals, based on the speech signals and the direction of arrival of the target speeches, to generate the enhanced speech signals;
    reading a probability model, which is the product of a first normal distribution and a second normal distribution, wherein the first normal distribution is a model which has learned features of clean speeches and the second normal distribution is a model which has a mean in the probability distribution of the enhanced speech signals and is made so as to have a variance smaller than that of the first normal distribution in a case where the aliasing metric is close to zero; and
    inputting the enhanced speech signals and the aliasing metric to the probability model to output target speeches.

2. The method according to claim 1, the method further comprising calculating, for each of the at least one pair of the speech input devices, a channel correlation metric which represents a degree of correlation between the speech input devices or a cross-spectrum-based metric between the speech input devices, based on the obtained speech signals and
    wherein the second normal distribution is made so as to have a variance smaller than that of the first normal distribution in a case where the channel correlation metric or the cross-spectrum-based metric is close to one.

3. The method according to claim 2, wherein a cross-spectrum-based metric as the channel correlation metric is processed by a filter bank and then input to the probability model, when use is made of a post filter after the use of the adaptive beamformer in the enhancement of the speech signals.

4. The method according to claim 2, wherein if the number of the speech input devices is more than or equal to three, the correlation metrics for all pairs of the speech input devices are averaged and then input to the probability model or processed using a filter bank or a post filter.

5. The method according to claim 2, wherein if the number of the speech input devices is more than or equal to three, the cross-spectral densities for all pairs of the speech input devices are averaged and input to the probability model or processed using a filter bank or a post filter.

6. The method according to claim 2, wherein the followings are repeated for each flame of the speech signals: obtaining speech signals, calculating a direction of arrival of target speeches and directions of arrival of other speeches, calculating a channel correlation metric or the cross-spectrum-based metric, calculating an aliasing metric, generating enhanced speech signals, reading a probability model, and inputting the enhanced speech signals and the aliasing metric to the probability model to output target speeches.

7. The method according to claim 1, wherein the second normal distribution is made so as to have a variance larger than that of the first normal distribution in a case where the aliasing metric is close to one.

8. The method according to claim 1, the method further comprising calculating, for each of the at least one pair of the speech input devices, a channel correlation metric which represents a degree of correlation between the speech input devices or a cross-spectrum-based metric between the speech input devices, based on the obtained speech signals, and wherein the second normal distribution is made so as to have a variance larger than that of the first normal distribution in a case where the channel correlation metric or the cross-spectrum-based metric between the speech input devices is close to zero.

9. The method according to claim 1, wherein use is made of a filter bank after the use of the adaptive beamformer in the enhancement of the speech signals.

10. The method according to claim 9, wherein the speech signals are logarithmic-converted after the use of the filter bank in the enhancement of the speech signals.

11. The method according to claim 1, wherein use is made of a post filter after the use of the adaptive beamformer in the enhancement of the speech signals.

12. The method according to claim 11, wherein use is made of a filter bank after the use of the post filter in the enhancement of the speech signals.

13. The method according to claim 12, wherein the speech signals are logarithmic-converted after the use of the filter bank in the enhancement of the speech signals.

14. The method according to claim 1, wherein the calculated aliasing metric is processed by a filter bank and then input to the probability model.

15. The method according to claim 1, wherein if the number of the speech input devices is more than or equal to three, the calculated aliasing metrics are averaged and then input to the probability model or processed using a filter bank.

16. The method according to claim 1, wherein the followings are repeated for each flame of the speech signals: obtaining speech signals, calculating a direction of arrival of target speeches and directions of arrival of other speeches, calculating an aliasing metric, generating enhanced speech signals, reading a probability model, and inputting the enhanced speech signals and the aliasing metric to the probability model to output target speeches.

17. A system, comprising:
a processor; and
a memory storing a program, which, when executed on the processor, performs an operation for separating a target speech from a plurality of other speeches having different directions of arrival, the operation comprising:
obtaining speech signals from each of a multiple of speech input devices disposed apart in predetermined distances from one another;
calculating, based on the speech signals, a direction of arrival of target speeches and directions of arrival of other speeches other than the target speeches for each of at least one pair of speech input devices;
calculating, for each of the at least one pair of speech input devices, an aliasing metric, based on the direction of arrival of the target speeches and the directions of arrival of the other speeches, wherein the aliasing metric indicates which frequency band of speeches is susceptible to spatial aliasing;
enhancing, using an adaptive beamformer, the speech signals arrived from the direction of arrival of the target speech signals, based on the speech signals and the direction of arrival of the target speeches, to generate the enhanced speech signals;
reading a probability model which is the product of a first normal distribution and a second normal distribution, wherein the first normal distribution is a model which has learned features of clean speeches and the second normal distribution is a model which has a mean in the probability distribution of the enhanced speech signals and is made so as to have a variance smaller than that of the first normal distribution in a case where the aliasing metric is close to zero; and
inputting the enhanced speech signals and the aliasing metric to the probability model to output target speeches.

18. The system according to claim 17, the operation further comprising calculating, for each of the at least one pair of the speech input devices, a channel correlation metric which represents a degree of correlation between the speech input devices or a cross-spectrum-based metric between the speech input devices, based on the obtained speech signals, and wherein the second normal distribution is made so as to have a variance smaller than that of the first normal distribution in a case where the channel correlation metric or the cross-spectrum-based metric is close to one.

19. A computer program product for separating a target speech from a plurality of other speeches having different directions of arrival, the computer program product comprising a computer usable storage medium having program instructions embodied therewith, wherein the computer readable storage medium is not a transitory signal per se, the program instructions executable by a computer to cause the computer to perform a method comprising:
obtaining speech signals from each of a multiple of speech input devices disposed apart in predetermined distances from one another;
calculating, based on the speech signals, a direction of arrival of target speeches and directions of arrival of other speeches other than the target speeches for each of at least one pair of speech input devices;
calculating, for each of the at least one pair of speech input devices, an aliasing metric, based on the direction of arrival of the target speeches and the directions of arrival of the other speeches, wherein the aliasing metric indicates which frequency band of speeches is susceptible to spatial aliasing;
enhancing, using an adaptive beamformer, the speech signals arrived from the direction of arrival of the target speech signals, based on the speech signals and the direction of arrival of the target speeches, to generate the enhanced speech signals;
reading a probability model which is the product of a first normal distribution and a second normal distribution, wherein the first normal distribution is a model which has learned features of clean speeches and the second normal distribution is a model which has a mean in the probability distribution of the enhanced speech signals and is made so as to have a variance smaller than that of the first normal distribution in a case where the aliasing metric is close to zero, and
inputting the enhanced speech signals and the aliasing metric to the probability model to output target speeches.

20. The computer program product according to claim 19, the method further comprising calculating, for each of the at least one pair of the speech input devices, a channel correlation metric which represents a degree of correlation between the speech input devices or a cross-spectrum-based metric between the speech input devices, based on the obtained speech signals and wherein the second normal distribution is made so as to have a variance smaller than that of the first normal distribution in a case where the channel correlation metric or the cross-spectrum-based metric is close to one.

* * * * *